April 28, 1942.  D. B. DICKERSON  2,281,143
JOINTED HAND BRAKE LEVER
Filed Dec. 29, 1939   5 Sheets-Sheet 1

Inventor
Dorman B. Dickerson

April 28, 1942.　　D. B. DICKERSON　　2,281,143
JOINTED HAND BRAKE LEVER
Filed Dec. 29, 1939　　5 Sheets-Sheet 4

Inventor
Dorman B. Dickerson
by Charles W. Hills Attys.

April 28, 1942. D. B. DICKERSON 2,281,143
JOINTED HAND BRAKE LEVER
Filed Dec. 29, 1939 5 Sheets-Sheet 5

Inventor
Dorman B. Dickerson

Patented Apr. 28, 1942

2,281,143

UNITED STATES PATENT OFFICE 2,281,143

JOINTED HAND BRAKE LEVER

Dorman B. Dickerson, Detroit, Mich., assignor to Houdaille-Hershey Corporation, Detroit, Mich., a corporation of Michigan Application December 29, 1939, Serial No. 311,550

17 Claims. (Cl. 74—524)

The present invention relates to a brake lever of the dash type for an automotive vehicle and is more particularly directed to an emergency lever that is jointed for the purpose of swinging a portion thereof to an out-of-the-way position when the lever is in a brake setting position.

In the modern automotive vehicle having an emergency brake of the dash type, considerable difficulty has been experienced from time to time because of the handle portion of the brake lever extending toward the seat of the vehicle in an interfering position when the brake lever is pulled to a brake setting position. This is particularly true of the later models due to the trend in furnishing wider front doors.

Usually, the brake lever is so constructed and positioned that when the brake linings are new or the brakes have been closely adjusted, the handle portion of the brake lever does not extend toward the front seat sufficiently to interfere with the egress or ingress of the vehicle operator. As the brake linings wear, however, it is necessary that the brake operating lever swing in a greater arc to overcome the wear. Unless provision is made whereby the lever can swing to a substantially horizontal position without the above mentioned interference, it may be necessary either to have the brakes frequently adjusted or to enter or leave the automobile on the side opposite the driver's seat. This is particularly annoying to a vehicle operator, especially to women.

It is therefore an object of this invention to provide an automotive emergency brake lever of the dash type comprising two hinged parts, one of which is maintained in a brake-setting position while the other part may be swung to an out-of-the-way position under the instrument board.

Another object of this invention is to provide an improved two-part jointed brake lever of the friction or the pawl and ratchet type.

A further object of the invention is to provide a brake lever consisting of two hinged parts, one of which is capable of being swung on the other part in an arc of predetermined limits.

A still further object is to provide a brake lever of two parts so formed that the parts are hinged together and can be positively latched to provide a unitary lever for actuating the automobile brakes.

The invention has for a further object the provision of a hand brake lever mechanism wherein the lever is formed of two parts adapted to be latched together to be swung in a brake-setting operation, and then unlatched so that one of the parts maintains the braking position while the other part is capable of being swung to an out-of-the-way position.

A still further object of the invention is the provision of a two part hinged lever with the parts being capable of being latched together only when one part is swung to a predetermined limit in one direction.

Still another object of the invention is the provision of a hand brake lever having hinged parts which, when latched together, provide a unitary brake lever with a grip portion at its end for operating the lever to brake-setting and brake-releasing positions.

The invention has for an additional object the provision of a hand brake lever consisting of two parts hinged together and capable of being latched to swing as a unit into an adjusted holding position, at which time the parts may be unlatched and one of them swung to an out-of-the-way place thereby rendering the latching and clutch operating means inoperative.

The invention has for a still further object the provision of a two part jointed brake lever in which all the operating parts are formed as one piece metal stampings.

The above, other and further objects of the invention will be apparent from the following description and accompanying drawings.

The accompanying drawings illustrate two embodiments of the present invention, and the views thereof are as follows.

As shown on the drawings.

The levers herein illustrated are of the so-called "dash type," that is, levers which are pivoted behind the instrument boards of automotive vehicles with the grip portions projecting below and beyond the instrument boards. Each of these levers are formed of two parts so shaped and related that when the lever is moved to brake-setting or "on" position, a handle portion thereof may be swung to an out-of-the-way place so as to clear the adjacent margin of the door opening.

Figure 13:
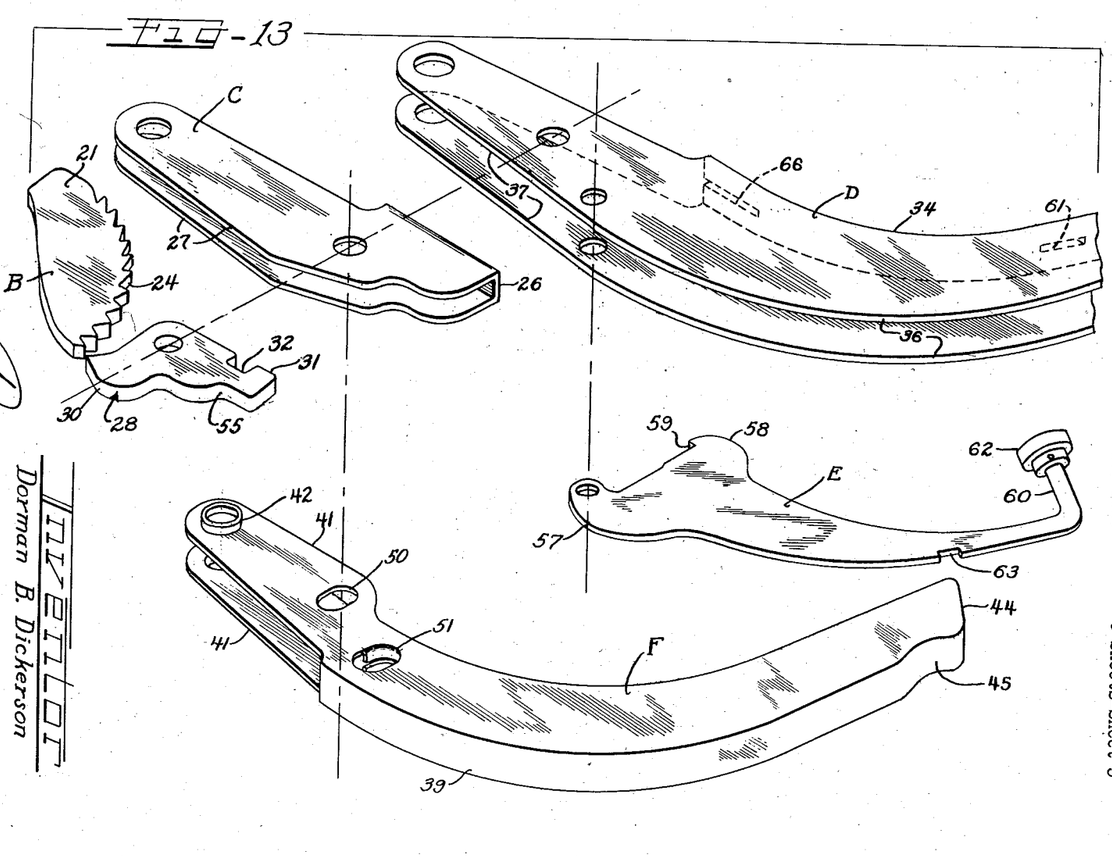
Figure 13 is an isometric view showing the parts of the two-part brake lever of the first embodiment exploded in two directions and illustrating the shape and relationship of the several parts.

One embodiment of the invention illustrated herein is shown in Figures 1 to 6 inclusive, and 13, and another embodiment thereof is shown in Figures 7 to 12, inclusive. Reference should be made particularly to Figure 13, which illustrates an exploded isometric view for more clearly showing the shape and respective relationship between the individual parts constituting the first embodiment of the two-part brake lever of this invention.

Figures 1, 4, 5, 6:
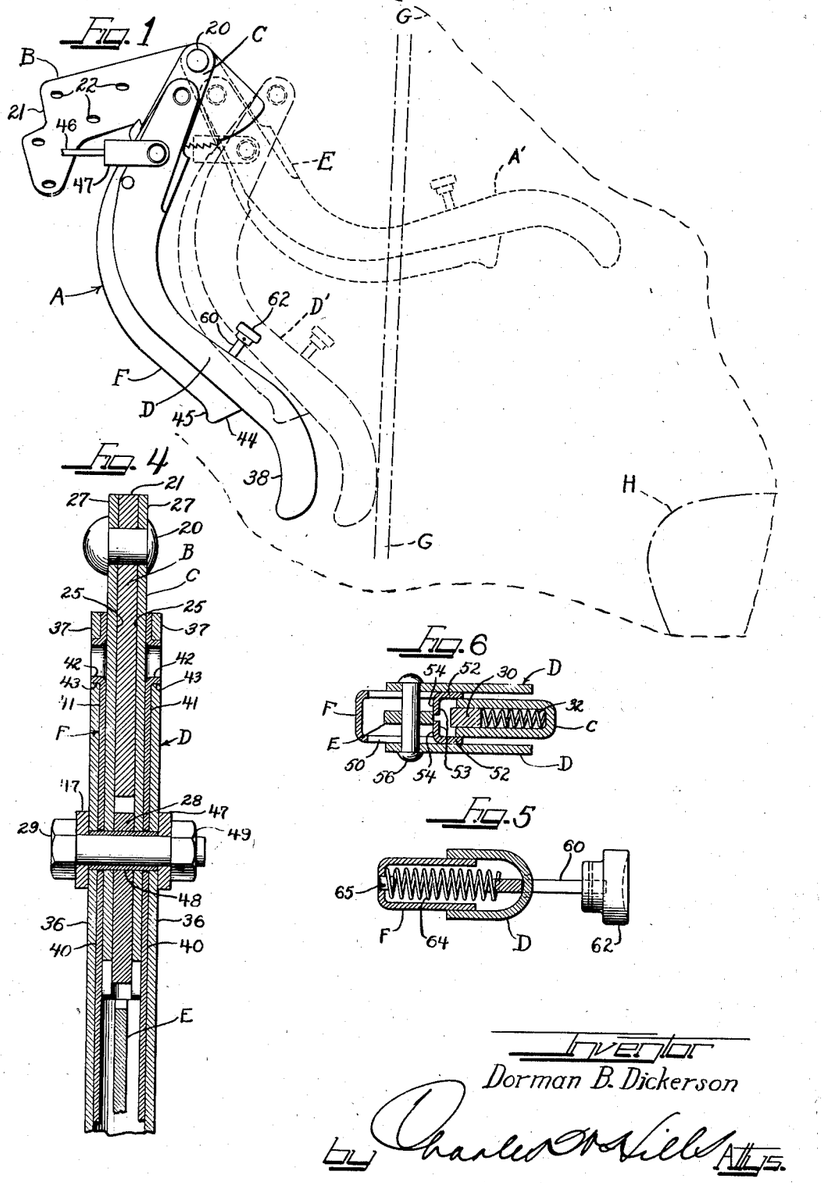
Figure 1 is a view in side elevation of one embodiment of the brake lever construction of this invention, diagrammatically illustrating the brake lever in dotted lines in a brake-setting position and also illustrating in dotted lines a part of the lever which has been swung to an out-of-the-way position.
Figure 4 is a longitudinal central section taken substantially in the plane indicated by the line IV—IV of Figure 2.
Figure 5 is a transverse sectional view with parts in elevation, taken substantially in the plane indicated by the line V—V of Figure 2 and looking in the direction of the arrows.
Figure 6 is a transverse sectional view with parts in elevation, taken substantially in the offset planes indicated by the line VI—VI of Figure 2 and looking in the direction of the arrows.

Referring to Figure 1, a brake lever generally designated by the reference character A is pivotally connected to, in depending relation from, a support or bracket B. The brake lever consists of two parts, an upper part C and a lower part D which is hinged to said first part. The brake lever parts C and D are latched together by a latching member E. The clutching engagement between the brake lever A and the support B is controlled by the actuation of the clutch release member F. The shape and operative relationship of these parts will now be more fully explained.

As diagrammatically illustrated in Figure 1, the brake lever A, as shown in solid lines, discloses the lever in a brake "released" position. As shown in dotted lines, the brake lever A' is shown in a brake "setting" position. As illustrated, the positions of the brake levers A and A' are the maximum limits of swing required to move the brake lever from a full brake release to a full brake actuation.

The relative position of the adjacent margin of the door opening is shown by the lines G—G. As clearly shown in Figure 1, when the brake lever is swung to a brake "setting" position it extends beyond the adjacent margin G—G of the door towards the vehicle seat H in such a manner that the handle portion thereof is in an interfering position. To eliminate this objectionable feature, the brake lever of the present invention is so formed that a part of the lever is adapted to be swung to an out-of-the-way position, which is designated by the reference character D'. In this position an operator may enter or leave the vehicle without coming into contact with the brake lever.

It is necessary, of course, to provide a two-part lever which is capable of being latched in such a manner that the parts may be swung as a unitary lever to apply and release the brakes. It is also necessary to maintain that portion of the brake lever which operates the brake actuating rod in a brake-setting position when the other part of the lever is swung to an out-of-the-way place.

Figures 2, 3:
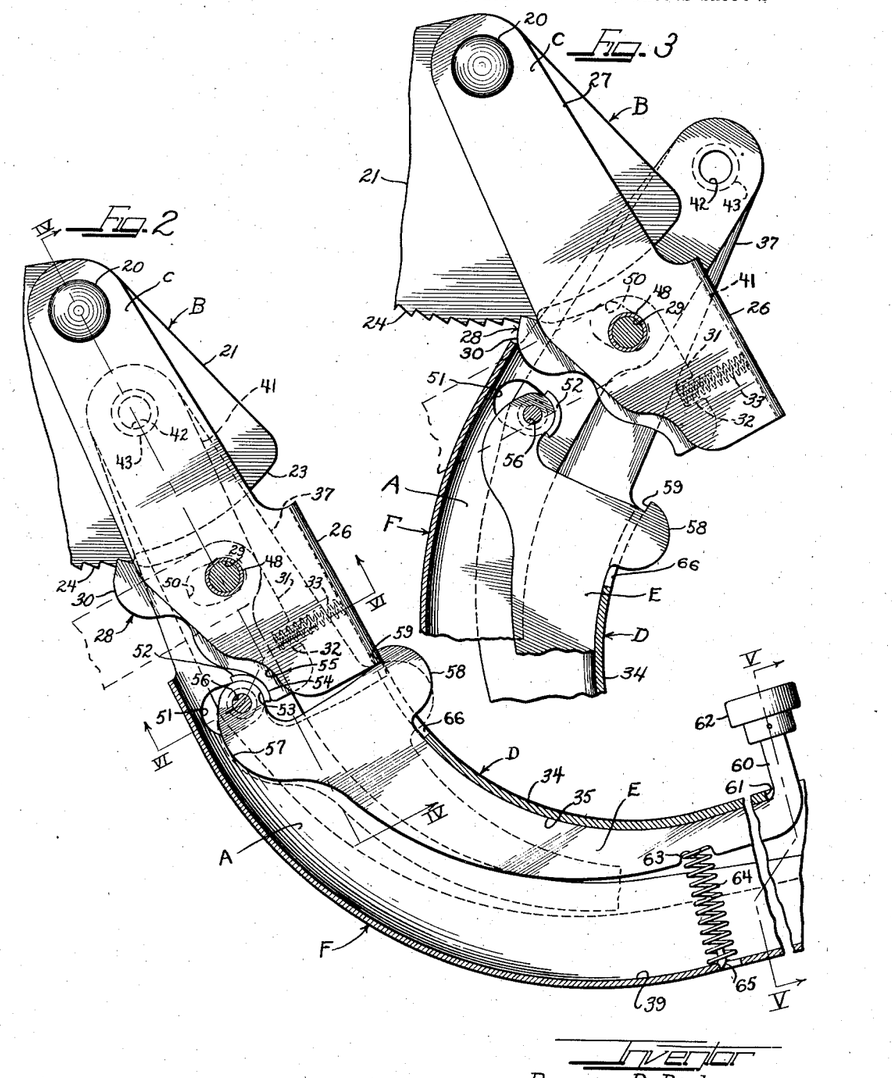
Figure 2 is an enlarged broken view, partially in side elevation and partially in vertical section of a latched two-part brake lever embodying the principles of the present invention as shown in Figure 1.
Figure 3 is a view similar to Figure 2, showing the two-part brake lever in an unlatched position, with one of the parts swung to an out-of-the-way place.

Referring to Figures 2 and 3, the brake lever A is formed as a stamping from flat metal, and as illustrated includes an upper part C which is pivotally connected to the support B by a rivet 20.

The support B, illustrated in Figures 1 to 4, consists of a bracket plate 21 suitably provided with openings 22 for the reception of rivets or bolts (not shown) for securing the bracket in place behind the instrument board of an automotive vehicle.

In the embodiment illustrated, the bracket plate 21 is formed to provide an arcuate edge 23, the radius of which is described from the center of the pivotal rivet 20. A portion of this edge 23 presents a clutching surface 24, illustrated as being serrated or toothed.

The upper lever part C is formed as a stamping from flat metal and is shaped to provide a portion of U-shaped cross-section having spaced side walls 25 and a web 26. The side walls 25 are extended to provide a pair of spaced legs 27 which straddle the support B and hang in pivotal depending relation therefrom by the pivot 20.

Positioned beneath the clutching surface 24 of the support member B is a pawl 28 which is pivotally secured to and located between the side walls 25 by means of a bolt 29 which will be more fully described hereinafter. The pawl 28 is a flat metal stamping of substantially L-shape. The pawl 28 is pivotally supported at the junction of its angularly extending legs 30 and 31. The leg 30 of the pawl 28 cooperates with the ratchet surface 24 to hold the lever in adjusted position. The other pawl leg 31 is formed with a slot 32 arranged to receive one end of a coil spring 33. The other end of the coil spring 33 abuts the web 26 of the upper lever part C. Compression of this spring normally urges the pawl 28 into latching engagement with the ratchet surface 24.

The lower brake lever part D is formed as a stamping from flat metal which is of U-shaped cross-section for a major portion of its length and which portion is designated by the reference numeral 34. The U-shaped section of the lever part D provides a web 35 and side walls 36. At the upper end of the lever part D, the side walls 36 are extended to provide spaced parallel legs 37. At the other end of the lever part D, there is provided a handle grip portion 38 of hollow configuration formed by bending the side walls together, as shown in Figure 1.

As illustrated in Figure 1, the lever part D is bent in a direction toward the vehicle operator thus bringing the handle or grip portion 38 to a more convenient manipulating position. This shape provides an offset grip with respect to the fulcrum portion.

The lever part D is pivotally connected to the other lever part C at a point in spaced relation from the extremities of the spaced legs 37 by the bolt 29. It is to be noted that the legs 37 are spaced sufficiently so that they overlap the side walls 25 and spaced legs 27 of the lever part C.

A pawl actuating member F is formed as a stamping from flat metal having a U-shaped cross section for a major portion of its length. This U-shaped cross section provides a web 39 and side walls 40. At one end of this member, the side walls 40 are extended to provide spaced parallel legs 41. Adjacent the ends of these legs, there is provided pivotal trunnions 42 formed of outwardly extending flanged portions of the legs. These outwardly flanged trunnions 42 are pivotally received in openings 43 provided in the legs 37 of the lever part D in such a manner that the ends of the legs 37 and 41 are flush. As shown in Figure 4, the planes of the side walls 40 and legs 41 are in flush parallel relation, on the inside, with the planes of the side walls 36 and legs 37 of the lever part D. In other words, the U-shaped portions of members D and F are in nested relation with their webs 35 and 39 in opposition.

At the other end of the pawl actuating member F, the side walls 40 are bent inwardly to form an end wall 44 (Figure 1). Immediately adjacent the end wall 44, there is provided a digitally operable portion 45 for operating the member F on its pivot 42.

The braking mechanism of the vehicle (not shown) may be suitably connected to the lever part C by means of a cable 46 and a clevis 47 connected to the lever part by means of the bolt 29 so that movement of the lever structure about its pivot or fulcrum 20 will actuate the braking mechanism through movement of the cable 46.

As clearly shown in Figure 4, the pivot bolt 29 is provided with a spacer sleeve 48. This sleeve extends between the side walls of the clevis 47 and has a sufficient length to retain the members 28, C, D and F between its ends so that when the nut 49 is tightened on the bolt 29 the members are free to swing on the common pivot. The clevis 47 and the sleeve 48 turn freely on the bolt 29.

In this pivotally connected relation, the brake parts C and D are so hinged together that the part D is capable of swinging on its pivot only within predetermined limits, as shown in Figures 2 and 3.

Enlarged slots 50 are provided in the spaced legs 41 of the clutch release member F through which the bolt 29 and sleeve 48 may pass. Each of these slots has a diameter along the longitudinal center line of the member F, as shown in Figure 2, slightly larger than the outside diameter of the sleeve 48. The length of the slots 50 in the opposite direction is such that the clutch release member F may be rocked on its trunnion pivot 42 between the limits necessary to move the pawl from a clutching position to clutch release position without bearing or exerting any pressure against the sleeve 48.

There is also provided enlarged slots 51 in the side walls 40 of the clutch release member F for a purpose to be described later. These slots are positioned adjacent the leg 31 of the pawl 28. Each slot 51 has a flange portion 52 struck inwardly to form a curved seat having an inner seating surface 53 and an outer seating surface 54, as clearly shown in Figure 6. On one side of the pawl leg 31 there is provided a curved edge 55 (Figure 2) which abuts in seating relation the outer surface of the curved flange seat 54.

When the clutch release member F is manually actuated about the pivotal trunnion 42, the curved flanges 52, 52, which seat against the curved edge 55 of the pawl, urge the pawl 28 out of engagement with the clutch surface 24.

Another member, a latching member E is pivotally connected to the brake lever part D by a pin or rivet 56. As illustrated in Figure 6, the pivotal connection between the members E and D by means of the pin 56 is such that there is no lost motion between the members. The pin 56 also passes through the enlarged opening 51, which is provided in the side walls 40 of the clutch release member F. As the opening 51 is longer in a transverse direction than in a direction longitudinally of the member F, the latter may be actuated in a clutch releasing direction without exerting pressure on the pin 56.

The latching member E is formed of flat metal with a laterally extending portion 57 at its upper extremity through which the pin 56 extends for pivotal connection to the lever part D. At the same extremity of the latch release member E as the pivotal connection but in lateral spaced relation therefrom, there is provided a semi-circular nose or latching portion 58. This nose portion is so shaped as to provide a straight hook edge 59. The latch release member E is longitudinally curved so that one edge thereof is seated against the inside of the web 34 of the lever part D, when the parts are arranged as illustrated in Figure 2. At the lower or opposite extremity of this member E, there is provided a laterally extending portion 60. This extension projects through an opening 61 provided in the web 35 of the lever part D in a position adjacent the upper end of the grip portion 38, as clearly shown in Figure 1. Connected to the free end of the extension 60 is a thumb button 62.

At a point intermediate the ends of the member E, there is provided an edge slot 63 which positions and holds one end of a coil spring 64. The other end of the spring 64 abuts the web 39 of the member F and is held in position by an inturned portion 65 thereof, as illustrated in Figures 2 and 5.

Compression of the spring 64 normally holds the member E in seated relation against the web 35 of the lever part D and urges the clutch release member F in a projected position ready for actuation. As shown in Figure 2, this position of the member E is the position in which the lever parts C and D are latched. When thumb pressure is exerted on the thumb button 62, the latching member E swings about the pivot 56 in a clockwise direction. The member then assumes a position as shown in dotted lines. In this actuated position, the hook edge 59 of the nose 58 is disengaged from its abutting relation with the web 26. Sufficient clearance is provided by a slot 66 in the web 35 to allow for the vertical displacement of the nose 58 when the member E is actuated. In this position, the unlatched lever part D is free to swing about the pivot 29 to a position as illustrated in Figure 3. When in latched position, as shown in full lines in Figure 2, compression of the spring 64 is such as to maintain the latched engagement of the lever parts C and D.

From the foregoing description, it will be noted that the latched lever A can be oscillated from a position in which the brakes are fully released, as illustrated in full lines in Figure 1, to a position in which the brakes are fully applied or actuated, as illustrated in dotted lines and designated by the reference character A'. The lever part D is unlatched by depressing the thumb button 62 of the latching member E and the lever part may then be swung to an out-of-the-way place as designated by the reference character D'. This position of the lever part D may be effected at any adjusted position of the brake lever when swung in a brake "setting" direction without affecting such adjusted position of the upper lever part C.

By swinging the lever part D to the limit of swing in one direction, the lever parts C and D can be latched together. The clutch release member F is actuated by the digital portion 45 to disengage the pawl 28 from the clutching surface 24. The unitary lever A may then be oscillated to a brake releasing position.

It is to be noted that the unlatching of the lever parts C and D renders the members E and F inoperative.

Figures 7 to 12, inclusive, illustrate another embodiment of the present invention. In this form of the invention, a brake lever generally designated by the reference character M is pivotally connected to, in depending relation from, a support or bracket N by a pin or rivet 70.

Figures 7, 10, 11, 12:
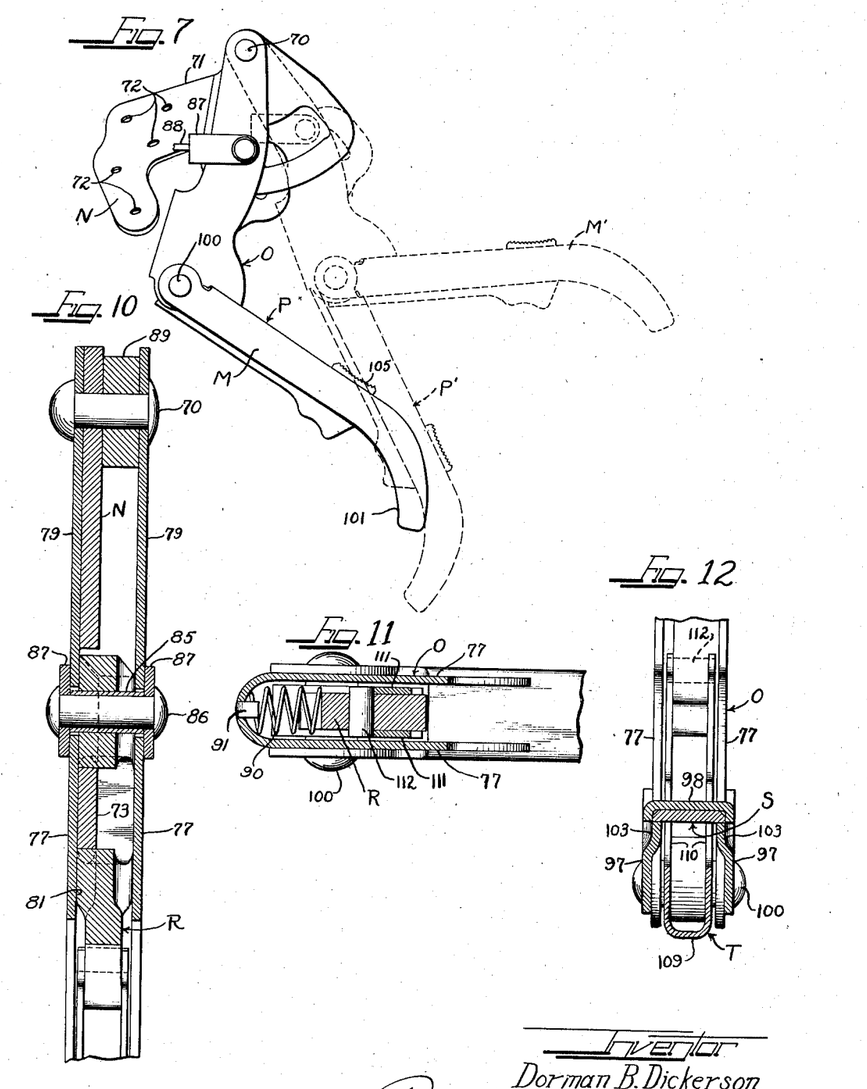
Figure 7 is a view in side elevation of another embodiment of the two-part brake lever construction of this invention, diagrammatically illustrating in dotted lines the brake lever in a brake setting position and also of a part of the lever which has been swung to an out-of-the-way position.
Figure 10 is an enlarged broken longitudinal central section taken substantially in the plane indicated by the line X—X of Figure 8 and looking in the direction of the arrows.
Figure 11 is an enlarged broken transverse section taken substantially in the plane indicated by the line XI—XI of Figure 8 and looking in the direction of the arrows.
Figure 12 is an enlarged broken transverse section taken substantially in the plane indicated by the line XII—XII of Figure 8 and looking in the direction of the arrows.

As illustrated in Figure 7, the bracket N consists of a bracket plate 71 suitably provided with openings 72 for the reception of rivets or bolts (not shown) for securing the bracket in the same manner as provided for in the previous embodiment of this invention. The support or bracket is stamped from flat metal and is fashioned to provide a sector 73 having concentric clutching surfaces 74 and 75. These clutching surfaces are described by radii having a center in the axis of the pivot 70 which pivotally connects the lever member M to the support N.

Brake lever M consists of two parts, an upper lever part O and a lower lever part P. The upper lever part O is stamped from flat metal and provides a body portion 76 which is U-shaped in cross section. This U-shaped body portion provides spaced parallel side walls 77 and a web 78. The side walls 77 are extended to provide a pair of spaced legs 79 which straddle the support N and hang in pivotal depending relation therefrom by the pivot pin 70.

A stamping R is formed to provide a locking member 80 having a laterally extending off-set or bulged portion 81 which is apertured to receive the sector 73. In the formation of the aperture the upper and lower margins thereof are formed with projections 82 and 83, which extend towards each other and are adapted to engage respectively with the concave and convex concentric surfaces of the sector 73 in frictional holding engagement to clutch the lever in adjusted position.

The surfaces of the projections 82 and 83 are rounded sufficiently to prevent damage to the concentric surfaces of the sector when the lever is in clutched engagement and a braking load is imposed on the lever.

An elongated slot 84 is provided in the upper part of the bulged portion 81 of the locking member R to receive a tubular pivot member 85. The spaced legs 79 are apertured to receive the tubular pivot member 85 which pivotally mounts the locking member R on the lever part O in such a manner that the locking member is arranged to work between the spaced legs 79. A rivet, or other pivot member, 86 passes through the tubular pivot member 85 and has connected to it a clevis 87 which is operatively connected to the brake rigging in the vehicle by a rod 88.

As illustrated in Figure 10, a spacer 89 is provided at the upper end of the spaced legs 79 for the purpose of laterally spacing the bracket N in relation to the legs 79 thereby providing the necessary spacing between the legs 79 for the bulged portion 81 of the locking member R.

In order to maintain the locking member R in a position tilted sufficiently to cause it to frictionally engage the sector with holding action, a spring 90 is utilized. When urged to a tilted position, the elongated aperture 84 allows for the slight longitudinal bodily movement of the locking member with respect to the lever part O as the locking member is moved into and out of clutching engagement with the sector.

Figures 8, 9:
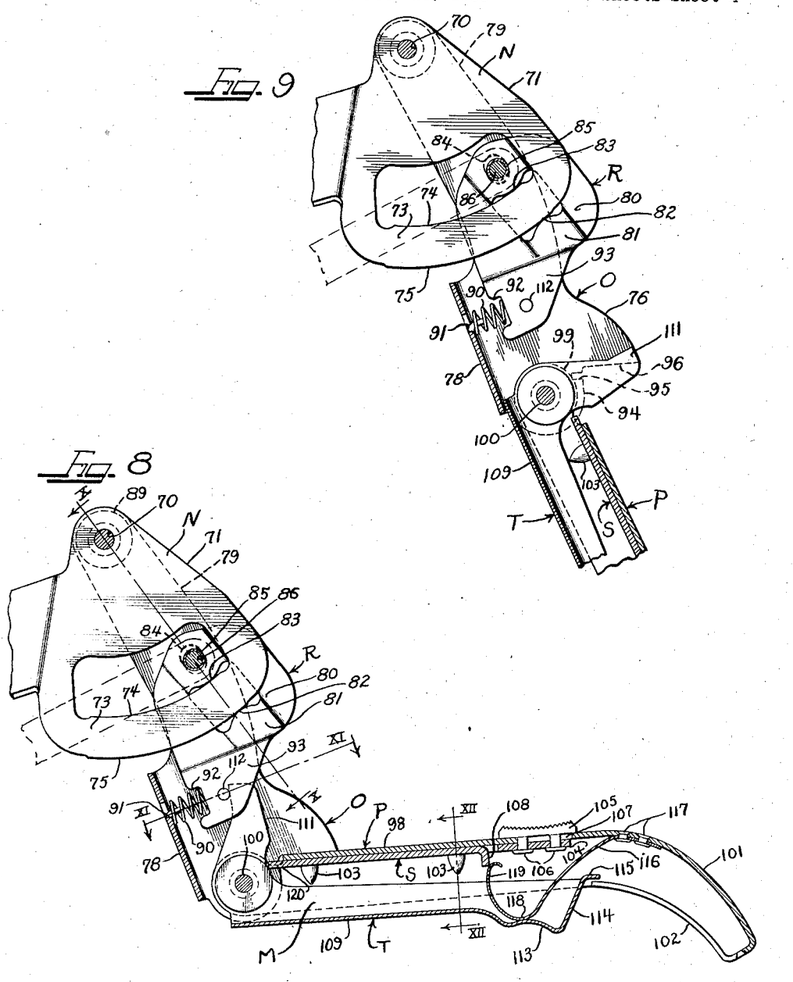
Figure 8 is an enlarged fragmentary view, partially in side elevation and partially in section, of the two-part brake lever as shown in Figure 7 when in a latched position.
Figure 9 is a broken view similar to Figure 8, showing the two-part lever in an unlatched position with one of the parts swung to an out-of-the-way place.

The coil spring 90 illustrated in Figures 8, 9 and 11, has one end positioned against the web 78 of the lever part O. This end of the spring is retained in position by an inturned lug 91. The other end of the spring 90 is received in a recess 92 which is provided in the lower inturned portion 93 of the locking member R.

As illustrated in Figure 9, the lower portion of the lever O is formed to provide an extended semi-circular portion 94 terminating in one direction in the web 78 and in the other direction in a slot 95. A straight edge 96, slightly offset from the slot 95, completes the lower edge of the lever part O. The purpose of the slot 95 and the straight edge 96 will be more fully explained hereinafter.

The lower lever part P is stamped from flat metal and provides a body portion which is U-shaped for a major portion of its length. As best illustrated in Figure 12, the U-shaped body portion of the lever part P provides spaced side walls 97 and a web 98. At the upper end of the lever part P, continuations of the side walls 97 form segmentally circular legs 99 (Figure 9). The spaced legs 99 are pivotally connected to the lever part O by a rivet, or other pivotal member, 100 in such a manner that the legs 99 straddle the side walls 77. In this pivotally connected relation, the webs 78 and 98 of the lever parts O and P are in opposition.

At the other end of the lever part P, a hollow closed grip portion 101 is formed by bending the side walls 97 toward each other whereby their edges met in a seam or line 102. The handle or grip portion 101 is offset in relation to the U-shaped body portion thus bringing the handle to a more convenient manipulating position.

A latching member S is formed from flat metal and is shaped to slidingly seat between the side walls 97 and the web 98 of the lever part P. As best illustrated in Figures 8 and 12, there is provided in the side walls 97 adjacent the web 98 inturned portions or bosses 103 the purpose of which is to maintain the latching member S in seated relation with the lever part P.

One end 104 of the latching member S extends to a position adjacent the upper portion of the grip 101. A serrated thumb button 105 slidingly engages the outer surface of the web 98 and is connected by means of rivets 106 to the end 104 of the latching member through a longitudinal slot 107. The length of the slot 107 determines the longitudinal distance the latching member S may be actuated. A lug 108 is struck out of the member S and turned downwardly, as illustrated in Figure 8, for a purpose which will be explained later.

A clutch release member T is formed as a stamping from flat metal having a U-shaped cross section for a major portion of its length. Figure 12 illustrates this U-shaped portion as providing a web 109 and spaced side walls 110. At one end of the member T, the side walls 110 are laterally extended to provide spaced parallel legs 111 which are pivotally connected to the lever part P by the rivet 100 in such a manner that the members P and T are in nested relation with their webs 98 and 109 in opposition.

The spaced legs 111 straddle the lower portion 93 of the clutch locking member R and are operatively associated therewith by abutment with a pin 112.

At the other end of the clutch release member T, the web 109 is shaped to provide a digitally operable portion 113 and an end wall 114 having an angular portion 115 extending slightly within the grip portion 101 to abut thereagainst for limiting movement of the member T in one direction.

An L-shaped flat metal spring 116 is connected at one end to the upper portion of the grip or handle 101 by means of rivets 117. The rounded portion 118 of the spring 116, normally urges the clutch release member T in a projected position in which the portion 115 abuts against the upper portion of the grip 101. A curved upwardly extending leg 119 of the spring engages against the lug 108 of the latching member S to normally urge the latter in latching direction.

As illustrated in Figure 9, the lever parts O and P are in unlatched position. If the grip portion 101 be grasped and pulled in a counter-clockwise direction, as shown in Figure 8, the web 98 will abut against the straight edge 96 on the lower part of the lever member O. It is necessary in swinging the lever in this direction to slide the thumb button 105 in a direction towards the grip portion 101. In this position, the latching member S is urged against the spring 116. With the web 98 in abutting relation with the edge 96, a release of the button 105 causes the spring 116 to urge the latching member S in a latching direction wherein the end 120 of the member engages within the slot 95.

As shown in Figure 8, when the parts are in this position the lever members O and P are in latched engagement.

Referring to Figure 7, the arrangement of the parts when in latched engagement and illustrated as being in a brake "released" position, is shown in full lines. When the latched unitary brake lever M is pulled to the right, such movement unclutches the locking member R as there would then be a tendency to swing the locking member about the projection 83 thus bringing the projection 82 out of holding engagement with the convex surface 75 of the sector.

The locking member R remains in frictional binding engagement with the concentric surfaces of the sector 73 by reason of the pull imposed on the lever member by the brake mechanism attached to the clevis 87 in addition to the compression of the spring 90 urging the locking member in counter-clockwise direction about the pivot 86. By tilting the locking member in this manner, the lower projection 82 is thereby urged into tight holding engagement with the convex surface 75 of the sector and any tendency of the brake lever assembly to swing to the left will thus increase the binding effect between the locking member and the sector to firmly hold the lever in its then adjusted position.

By digitally compressing the clutch release member T against compression of the spring 116, the spaced legs 111 are rocked about the pivot 100 and against the pin 112 thus overcoming the compression spring 90 to swing the clutch locking member R about its pivot 86. Rocking the clutch locking member in this direction results in frictional disengagement between the lower projection 82 and the convex surface 75 of the sector. The brake assembly M can then be swung in a brake "releasing" direction.

When the brake lever assembly is swung to a full brake "actuating" position, the parts assume the position denoted by the reference character M' as shown in dotted lines in Figure 7. By unlatching the lever parts O and P, the lever P may then be swung to a position as denoted by the reference character P'. In this position, the brake lever member P is swung to an out-of-the-way place.

It will be observed in Figure 9, that when the lever part P is swung to the last mentioned position the upper portion of the web 109 of the clutch release member T engages with the web 78 of the upper lever member O thereby limiting movement in a clockwise direction.

The invention has been described herein more or less precisely as to details, yet it is to be understood that the invention is not to be limited thereby, as changes may be made in the arrangements and proportions of parts, and equivalents may be substituted, without departing from the spirit and scope of the invention.

I claim as my invention:

1. In an automotive vehicle braking system, a manually operable brake lever at the driver's station in the vehicle pivotally connected to the system and being supported at its upper end for rearward movement to a latching and braking position, said lever including a plurality of sections one of which is a handle section depending downwardly from an upper section, and means for disconnecting the handle section from operative cooperation with said upper section when the brake lever is in a latched position without detaching the sections and for enabling forward swinging movement of said handle section below said upper section and toward the front of the vehicle to provide more clearance for the egress and ingress of the driver with respect to said driver's station, and latching means, effective only when said sections are in predetermined angular relation, for connecting said sections together for movement together as a single brake lever, said disconnecting and latching means including a lost motion connection between said sections providing for limited predetermined swinging movement of the handle section relative to the upper section when the sections are disconnected.

2. A jointed brake lever including an upper section and a lower section, a member carried by and extending along one of said sections for operatively locking the sections together for unitary movement, and for unlocking them whereby said one section is movable relative to the other section, clutching members for holding said other section in adjusted position to which it is moved, and a separate member carried by said one section and extending therealong for operating said clutching members into and out of engagement.

3. A jointed brake lever comprising an upper section and a lower section pivoted together with overlapping ends whereby said lower section is swingable on the upper section between predetermined limits, said upper section being pivoted to a support at its end opposite the end overlapped by the lower section, a clutching surface on said support, said lower section having a grip portion at its end opposite the connection to said upper section, means operatively locking said sections together for unitary movement including a latching member carried by said lower section and movable relative thereto, said latching member having a portion adjacent said grip for manual actuation, and a clutching member carried by said upper section and engageable with said support clutching surface for holding said upper section in adjusted positions to which it is moved, and a release member carried by said lower section and movable relative thereto for actuating said clutching member, said release member having a portion adjacent said grip for manual actuation.

4. A device as specified in claim 3 in which the means for latching the sections together comprises a sliding member operatively carried by said lower section and formed to provide a longitudinally operating portion at one end thereof, the other end of said sliding member adapted to engage in a slot in said upper section when the lower section is swung on the upper section to one of its swinging limits only.

5. A device as specified in claim 3 in which the means for latching the sections together comprises a rocking member pivoted to said lower section, said rocking member being formed to provide an actuating portion at one end thereof and at its other end with a nose portion having engagement with said upper section to hold the sections in engagement when the lower section is swung on the upper section to one of its swinging limits only.

6. A brake lever construction including a support having a clutching surface thereon, separate lever members having adjacent ends in straddling relation, a pivot connecting said adjacent ends together, a separate pivot connecting one of said lever members to said support, the other of said members having a hand grip portion for actuating said lever construction, a clutch member pivotally carried by said one of said lever members, resilient means urging said clutch member into holding engagement with said support, means for latching said lever members together in predetermined angular relation to constitute the working position of said lever members, and means engaging said clutch member and operable adjacent the grip portion of said last lever member for disengaging said clutching member from the support, said clutch member engaging means being inoperative when said lever members are not latched together.

7. A brake lever construction including a support having ratchet teeth provided along an edge thereof, a brake lever comprising two parts having a common pivot, one part being pivoted to said support, said other part terminating in a grip portion, a pawl pivotally carried by said first part and arranged to cooperate with said ratchet teeth in clutching engagement for maintaining said brake lever in adjusted position, said pawl being normally spring-urged into said clutching engagement, a pawl release member extending along a major portion of said other lever part and pivoted thereto adjacent said common pivot, said pawl release member having a manipulating portion adjacent said grip portion and an intermediate portion for engaging said pawl, latch means for locking said lever parts together, and a spring between said release member and said latch means to maintain said release member manipulating portion in operative position and to urge the latch means in locking direction.

8. A brake lever construction including a support having an integral part formed as an arcuate bar with concentric edges, a brake lever comprising two parts having a common pivot, one of said parts being pivoted to said support, said other part terminating in a grip portion, a locking dog member arranged for pivotal connection to said first lever part, said locking dog member having a central portion laterally offset and provided with cam surfaces in register with the concentric edges of said arcuate bar, spring means normally biasing said locking dog member to effect locking engagement with said bar to hold said brake lever in adjusted position, a pivoted pawl release member movable with said other lever part as the latter is swung about the common pivot, said clutch release member having a manipulating portion adjacent said grip portion, latch means for locking said lever parts together, and a spring to maintain said release member manipulating portion in operative position and to urge the latch member in locking direction.

9. A brake lever construction including a support, a two-part brake lever with one part pivoted to said support, brake operating means connected to said one part, cooperating clutching members spring urged into clutching engagement for holding said lever in adjusted position, the other lever part being pivoted to said first part and normally held in latched angular abutting relation therewith, latch means for maintaining said lever parts in said normal relation, and a pivoted clutch release member swingable with said other part and having a portion engageable with one of said clutching members to disengage said clutching member when said release member is rocked in one direction only when said parts are in said normal position, said other part being swingable to an out-of-the-way position in the plane of the lever swing after said lever has been moved to a brake-setting position.

10. A brake lever construction comprising a support, a two-part lever arranged for movement in a single plane with one part pivoted to said support, said one part being limited to swing in a predetermined arc in said single plane, said other part being hinged to said one part and adapted to swing thereon between predetermined limits in said single plane, means for latching said parts together when said other part is at one of its limits of movement, said parts when latched being capable of being swung about said support pivot by a manual grip portion provided at the free end of said other part, said one part and support having cooperating clutch members spring urged into holding engagement to retain the lever in adjusted position, and a clutch release member extending from a point adjacent the lever grip of said other part to one of said clutch members and effective for disengaging said clutch members only when said two parts are in latched engagement.

11. A brake lever construction comprising a support, a two-part lever, one part thereof being pivoted to said support, said one part and support having cooperative clutching means engageable to hold said one part in adjusted position relative to the support, spring means normally urging said clutching means into engaged relation, the other part being pivoted to said one part to swing thereon between fixed limits, said other part having a hand grip portion at its free end, means movable relative to said parts for latching them together into one lever when said other part is moved to one of said limits, means operative adjacent the grip portion for effecting a release of the clutch means whereby said lever may be adjustingly swung in relation to said support, said last means being effective as a clutch release only when said two parts are latched together, said latching means being effective to latch said two parts together only when said other part is moved to said one limit, and means adjacent said grip portion for actuating the latching means to enable relative movement of said lever parts.

12. A brake lever comprising two parts, one of said parts being pivoted to a support to swing thereon, one end of the other of said parts being pivoted to said one part to swing in relation thereto, the other end of said other part being formed to provide a lever operating grip portion, spring urged latching means carried by and movable relative to said other part for connecting said parts together to provide a single lever, said latching means being effective to latch said parts at only one point in the arc of travel of said other part in relation to said one part, and means available adjacent the operating grip portion of the other part for releasing said latching means from engagement with said one part.

13. A brake lever comprising two parts pivoted together adjacent ends, one of said parts being pivoted at its other end to a support, said one part and support having cooperating clutching means spring urged into engaged position to hold said one part in adjusted position relative to the support, a brake operating member connected to said one part between its pivoted ends, the other of said parts having a grip portion at its free end, said parts having engageable abutment means which are in abutting relation only when hand pull is applied to said grip to swing the lever in a direction to impose a pulling force on said brake operating member, means operative adjacent the grip portion for locking said parts in abutting relation and for releasing said locking engagement and the engagement of said clutching means to thereby permit the lever to swing in an opposite direction, said last means being operative as a clutch release only when said abutment means are in abutting relation.

14. A brake lever construction comprising two parts, one of said parts being pivoted to a support, the other of said parts being pivoted to said one part to swing between predetermined limits, said other part being formed to provide a hand grip portion at its free end, means for latching said two parts together at one of said limits only, clutching members spring urged into engaged position for holding said one part in adjusted relation with respect to the support, a manipulating portion adjacent the grip portion for actuating the latching means in unlatching direction, a clutch release member movable with said other part and having a manipulating portion adjacent the grip portion for actuating the release member to disengage the clutching members, and single spring means acting against both the latching means and the clutch release member for normally maintaining their manipulating portions in operative positions.

15. A brake lever construction comprising a two-part lever, one of said parts being a stamped metal member of U-shaped cross-section for a portion of its length with its side walls at one end extending into spaced legs, a support or attaching bracket having a portion thereof formed to provide a clutching surface, said spaced legs of said one part straddling the support and being pivoted thereto, the other of said parts being a longer stamped metal member of U-shaped cross-section for a major portion of its length having a grip portion at one end and being pivotally connected to said one part to swing between predetermined limits, a clutch member pivoted between the side walls of said one part and formed to effect locking engagement with said clutching surface on the support to hold said one part in adjusted position, spring means normally biasing said clutch member into said locking engagement with said support, the latching member for latching said parts together being positioned between the side walls of said other part, said latching member having an operating portion projecting outwardly with respect to said other part adjacent the grip portion thereof and being capable of movement for latching said two parts together at one of said swinging limits only, a stamping formed to provide a clutch release member of U-shaped cross-section movable with said other part in nested relation therewith and arranged with their webs in opposition, said clutch release member terminating in a digitally operable portion adjacent the grip portion of said other part for actuating the clutch release member to disengage the clutch member, and a single spring acting against both the clutch release member and the latching member for normally maintaining their manipulating portions in operative positions.

16. A brake lever construction comprising two lever parts, one of said parts being a metal stamping of U-shaped cross-section for a portion of its length and terminating at one end in spaced legs, a stamped metal support or attaching bracket having an integral part formed as an arcuate bar with concentric edges, said one part being pivoted to said support with its legs astraddle said bar, a stamping formed to provide a locking dog member pivoted to said one part and lying between the planes defined by the side walls and legs of said part, spring means acting against said locking dog for normally biasing the latter into frictional holding engagement with said arcuate bar, the other of said lever parts being a metal stamping of U-shaped cross-section having one end pivoted to said one part to swing within predetermined limits with the webs of said lever parts being positioned in opposition, the other end of said other part being formed to provide a hand grip portion, a flat latching member for latching the two lever parts together at one of said limits, said latching member being slidingly confined against the inner surface of the web of said other lever part, a thumb-actuated slide on the outside of the web of said other lever part connecting an end of said latching member through a slot in said web for longitudinally actuating the latching member, the other end of the latching member engaging a slot in the side walls of said one lever part when the other lever part is swung to said one limit, a stamping formed to provide a U-shaped clutch release member pivoted at one end to the pivot of said two parts and adapted for rocking said locking dog when the release member is rocked on its pivot in one direction, the other end of said release member terminating in a digitally operable manipulating portion adjacent the grip portion of said other lever part for actuating the release member to disengage the locking dog from frictional holding engagement with said arcuate bar when rocked in said one direction, said release member lying in nested relation with said other lever part with their webs in opposition, and a spring acting between said latching member and clutch release member, said spring functioning to urge the latching member in latching direction and urging the manipulating portion of the clutch release member to projected operative position.

17. A brake lever construction comprising two lever parts, one of said parts being a metal stamping of U-shaped cross-section for a portion of its length and terminating at one end in spaced legs, a stamped metal support or attaching bracket having an integral part formed as a clutching surface, said one lever part being pivoted to said support with its legs in straddling relation therewith, a stamping formed to provide a clutching member pivoted to said one lever part and lying between the planes defined by the side walls and legs of said part, spring means acting against said clutching member to normally bias the latter into locking engagement with said clutching surface, the other of said lever parts being a metal stamping of U-shaped cross-section having one end pivoted to said one lever part to swing within predetermined limits, the other end of said other part being formed to provide a U-shaped clutch release member pivoted at one end to and lying between the side walls of said other member and adapted for rocking said clutch member when the release member is rocked on its pivot in one direction, the other end of said release member terminating in a digitally operable manipulating portion adjacent the grip portion of said other lever part for rocking the release member in said one direction to disengage the clutch member from locking engagement with said support clutching surface, said release member lying in nested relation within said other lever part, a flat latching member for latching the two lever parts together at one of said limits of swinging movement, said latching member being rockably supported at one end by said release member, the other end of said latching member being formed to provide a thumb rocking manipulating portion extending through the web of said other lever part adjacent the grip portion thereof, a nose portion formed on the pivoted end of said latching member having a hook portion engageable with said one lever part to hold the lever parts in engagement when the other lever part is swung to said one limit only, and a spring acting between said latching member and clutch release member for urging the manipulating portion of said members to projected operative positions.

DORMAN B. DICKERSON.